United States Patent
Kim et al.

(10) Patent No.: US 6,860,102 B2
(45) Date of Patent: Mar. 1, 2005

(54) STATOR FOR A TORQUE CONVERTER OF A VEHICLE

(75) Inventors: Ki-Woo Kim, Hwaseong (KR); Jae-Duk Jang, Yongin (KR)

(73) Assignee: Hyundai Motor Company, Seoul (KR)

( * ) Notice: Subject to any disclaimer, the term of this patent is extended or adjusted under 35 U.S.C. 154(b) by 85 days.

(21) Appl. No.: 10/321,063

(22) Filed: Dec. 16, 2002

(65) Prior Publication Data

US 2003/0110764 A1 Jun. 19, 2003

(30) Foreign Application Priority Data

Dec. 18, 2001 (KR) .......................................... 2001-80500

(51) Int. Cl.[7] .............................................. F16D 33/18
(52) U.S. Cl. ......................................................... 60/361
(58) Field of Search ........................ 60/361; 416/197 C

(56) References Cited

U.S. PATENT DOCUMENTS

| | | | |
|---|---|---|---|
| 2,306,758 A | | 12/1942 | Schneider et al. |
| 2,755,628 A | * | 7/1956 | Mamo .......................... 60/356 |
| 4,377,068 A | * | 3/1983 | Braatz .......................... 60/356 |
| 4,726,185 A | * | 2/1988 | Shigemasa et al. ............ 60/361 |
| 5,125,487 A | * | 6/1992 | Hodge .......................... 60/345 |
| 5,224,348 A | * | 7/1993 | Ejiri .............................. 60/361 |
| 5,313,793 A | * | 5/1994 | Kirkwood et al. ............. 60/361 |
| 5,640,849 A | * | 6/1997 | Abe et al. ...................... 60/362 |
| 6,003,311 A | * | 12/1999 | Takada et al. ................. 60/362 |
| 6,216,454 B1 | * | 4/2001 | Tsuzuki ........................ 60/362 |
| 6,220,025 B1 | | 4/2001 | Mauti et al. ................... 60/362 |

FOREIGN PATENT DOCUMENTS

| | | |
|---|---|---|
| DE | 2729840 | 1/1978 |
| DE | 19637289 | 7/1997 |
| EP | 0 276 411 B1 | 6/1994 |
| EP | 0 846 894 B1 | 5/2002 |
| JP | 08331152 | 12/1996 |
| JP | 09309973 | 10/1997 |
| JP | 11-118019 | 4/1999 |
| WO | WO 99/43967 | 9/1999 |

* cited by examiner

*Primary Examiner*—Thomas E. Lazo
(74) *Attorney, Agent, or Firm*—Morgan Lewis & Bockius LLP

(57) ABSTRACT

A stator disposed between an impeller and a turbine of a torque converter including: an annular shell; an annular core disposed radially outside the shell; and a plurality of stator blades connecting the shell and the core. Each blade comprises a leading edge adjacent to the turbine, a trailing edge adjacent to the impeller, a streamlined concave surface extending from the leading edge to the trailing edge and substantially facing the turbine, and a streamlined convex surface extending from the leading edge to the trailing edge and substantially facing the impeller. A cross-sectional area of the stator blade increases as it approaches the shell. A predetermined gap is formed between the neighboring stator blades such that the neighboring stator blades do not overlap with one another.

6 Claims, 5 Drawing Sheets

STATOR FOR A TORQUE CONVERTER OF A VEHICLE

FIELD OF THE INVENTION

The present invention relates to a stator of a torque converter of an automotive automatic transmission.

BACKGROUND OF THE INVENTION

A torque converter is a hydraulic unit that transfers torque between an engine and an automatic transmission. The torque converter comprises an impeller, a turbine, and a stator that are disposed in a steel shell that is full of working fluid at all times. The impeller is disposed at a rear portion (near the engine) of the steel shell, and it turns with a crankshaft of an engine. The turbine is disposed at a front portion of the steel shell (near the transmission), and is generally splined to a transmission input shaft. The turbine is free to rotate independently from the impeller.

The working fluid flows from the impeller toward the turbine in a radial outer portion of the torque converter. The working fluid then flows from the turbine toward the impeller by way of the stator in a radial inner portion of the torque converter.

The stator is disposed between the impeller and the turbine, and it is fixedly coupled to a stator shaft through a one-way clutch. The stator shaft is generally connected to a non-rotating member fixedly coupled to a transmission housing. The stator is generally made of synthetic resins or an aluminum alloy, and consists of an annular shell, an annular core, and a series of stator blades connecting the annular shell and the annular core. The stator blades are located circumferentially and equidistant from each other, and each stator couples the outer peripheral surface of the shell to the inner peripheral surface of the core.

The fuel economy of a vehicle provided with a torque converter is generally poor because the impeller rotates even while the engine is idling, whereby increasing engine load. Therefore, it is important to decrease the load caused by the stator while the engine idles. It is also important to increase the torque-transferring efficiency of the torque converter.

When the engine rotates, the working fluid is forced to a radial outer portion of the torque converter by the impeller toward the turbine. However, the working fluid flows from a radial inner portion of the turbine back a radial inner portion of the impeller.

To reduce the axial size and weight of the automatic transmission, flattening of the torque converter is needed. A dominant factor in flattening of the torque converter is a reduction in an axial size of the stator. However, if the axial size of the stator is reduced, the overall hydraulic performance of the torque converter may deteriorate.

Therefore, a new shape of the stator blade that is capable of reducing the axial size and maintaining the overall hydraulic performance would be highly desirable.

SUMMARY OF THE INVENTION

In one preferred embodiment, the stator comprises an annular shell; an annular core disposed radially outside the shell; and a plurality of stator blades connecting the shell and the core. Each blade comprising a leading edge adjacent the turbine, a trailing edge adjacent the impeller, a streamlined concave surface extending from the leading edge to the trailing edge and substantially facing the turbine, and a streamlined convex surface extending from the leading edge to the trailing edge and substantially facing the impeller. A cross-sectional area of the stator blade increases as it approaches the shell. A predetermined gap is formed between the neighboring stator blades such that the neighboring stator blades do not overlap each other.

Preferably, the trailing edge of each stator blade is declined such that a gap between the trailing edge and the impeller is maintained to be constant. It is also preferable that the predetermined gap is in a range of from 1.5 mm to 2.5 mm.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

Hereinafter, a preferred embodiment of the present invention will be described in detail with reference to the accompanying drawings.

DETAILED DESCRIPTION OF THE PREFERRED EMBODIMENTS

Figure 1:
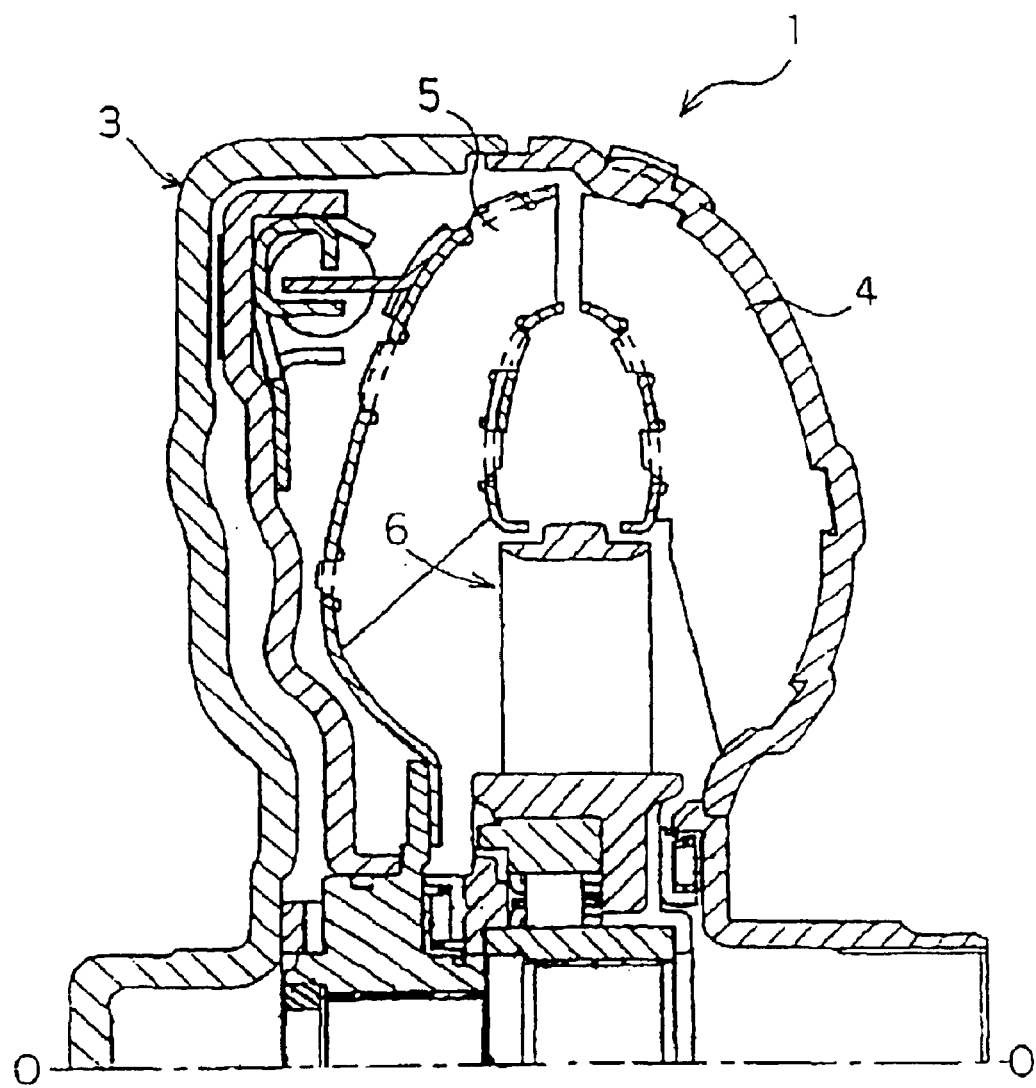
FIG. 1 is a schematic sectional view of the torque converter employing a stator according to the invention.

As shown in FIG. 1, a torque converter 1 comprises an impeller 4, a turbine 5, and a stator 6 that are rotatable along an axis O—O. An engine (not shown) and a transmission (not shown) are respectively disposed at left and right sides of the torque converter 1. A front cover 3 is provided in a front side toward where the engine is connected. The front cover 3 is preferably welded to the impeller 4 such that a chamber full of working fluid is formed therebetween.

The impeller is connected to a crankshaft of the engine, and engine torque is transmitted from the impeller to the turbine through an operation of the working fluid. The turbine 5 is connected to an input shaft of the transmission to transmit the engine torque to the transmission, and to transmit torque from the transmission to the engine.

When an engine is running, the rotating impeller causes fluid to be directed toward turbine vanes. When this occurs with sufficient force to overcome the resistance to rotation, the turbine begins to turn, turning the transmission input shaft.

When the turbine rotates, the fluid flow exiting the turbine 5 is directed back to the impeller 4 by way of the stator 6. The stator 6 redirects the fluid flow from the turbine 5 to the impeller 4 in the same direction as impeller rotation, thereby assisting impeller rotation.

Figure 2:
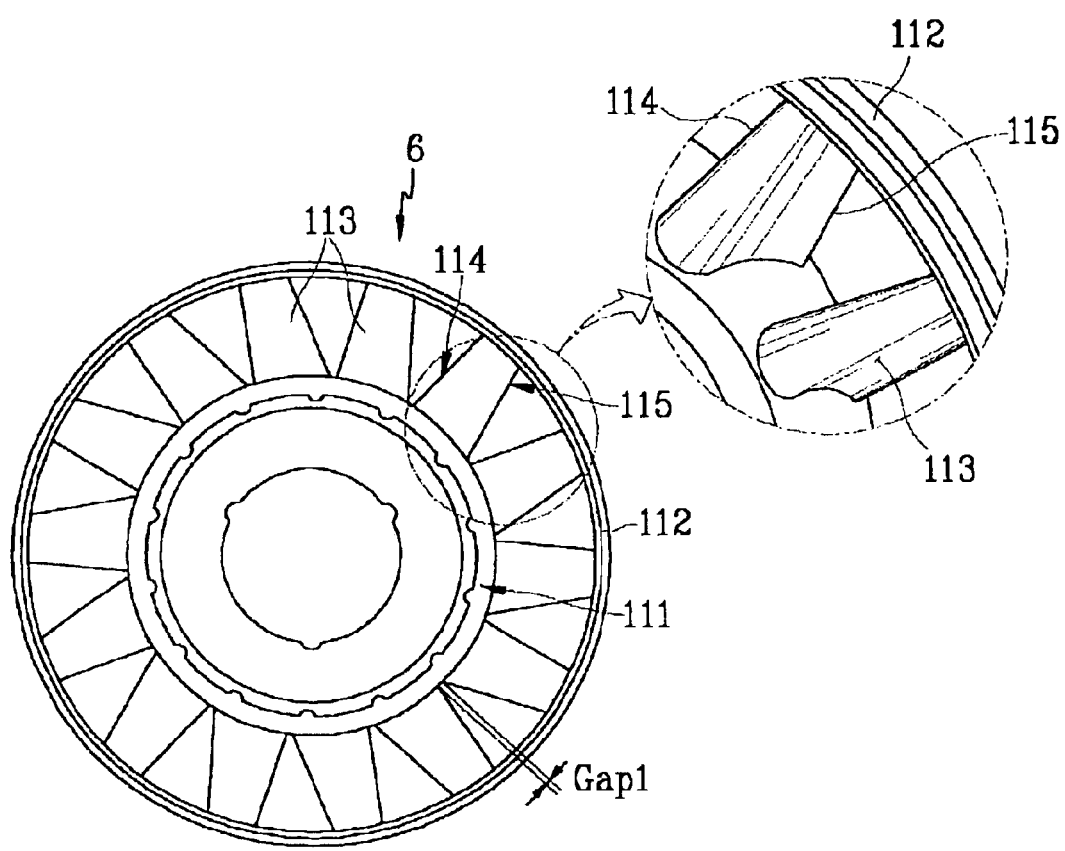
FIG. 2 is a front view of the stator of the torque converter according to the present invention.

As shown in FIG. 2, a stator 6 of a torque converter comprises an annular shell 111, an annular core 112, and a plurality of stator blades 113. These are preferably made of synthetic resins or an aluminum alloy as a single element. The shell 111 is connected to a stator shaft (not shown) that is fixed to a transmission housing. The core 112 is disposed radially outside the shell 111.

The stator blades 113 are connected to both the shell 111 and the core 112, and are circumferentially disposed at constant intervals. Each stator blade 113 is connected to an inner surface of the core 112 and an outer surface of the shell 111.

Figure 3:
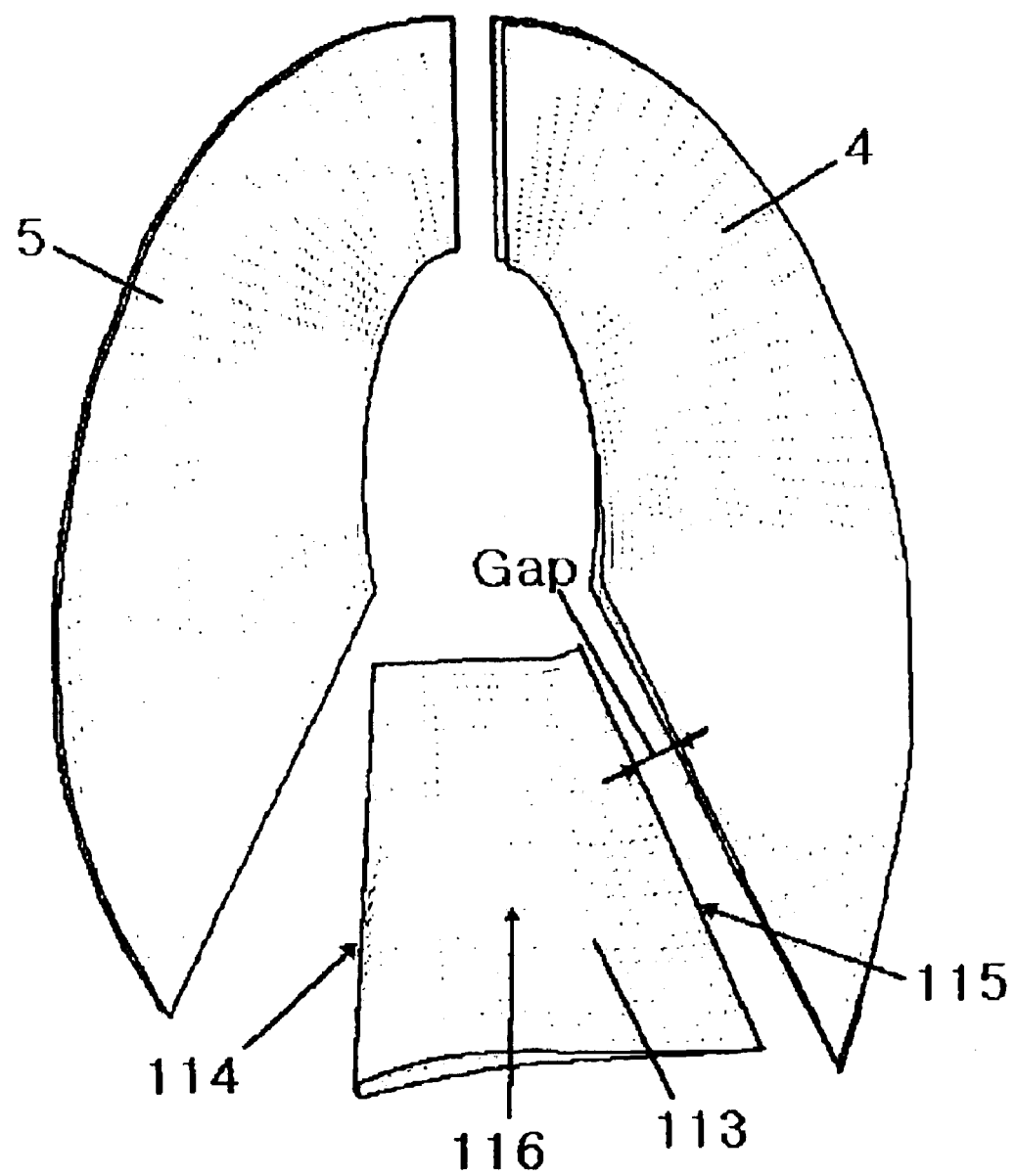
FIG. 3 is a side sectional view of the torque converter.
Figure 4:
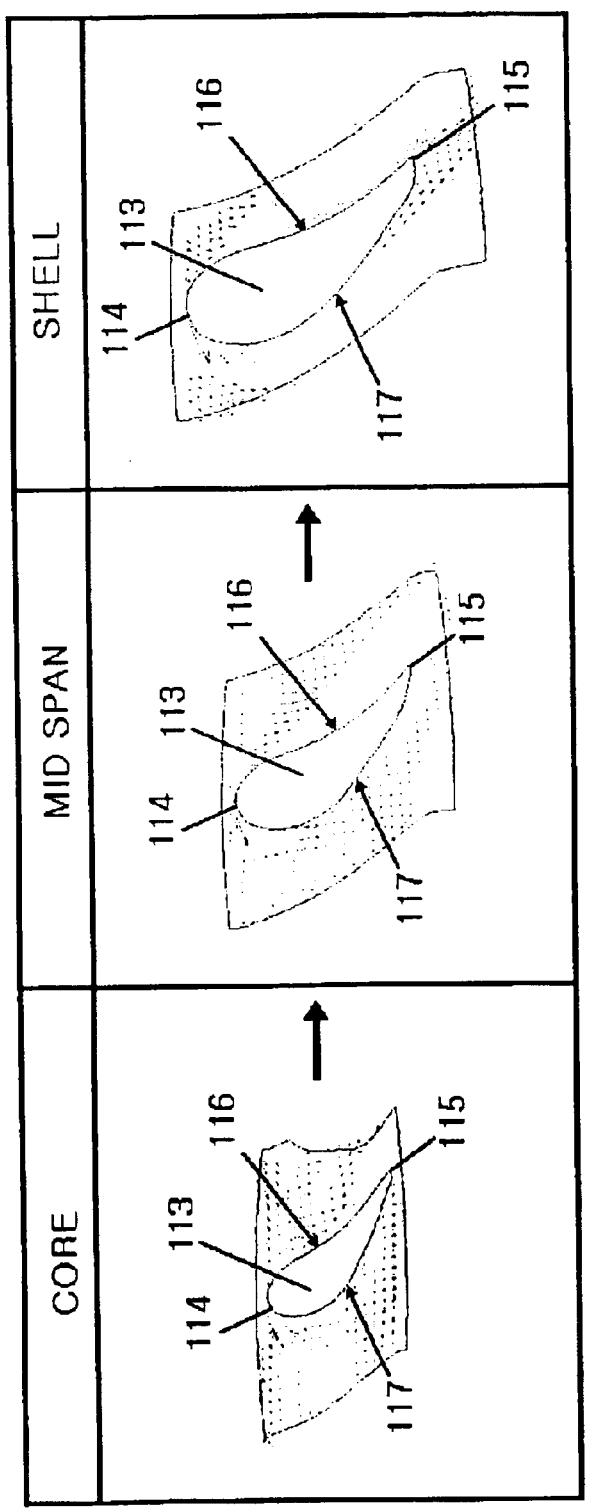
FIG. 4 shows a sectional view of the stator blade of the torque converter and a pattern of working fluid flow.

As shown in FIGS. 3 and 4, the stator blade 113 comprises a leading edge 114, a trailing edge 115, a concave surface 116, and a convex surface 117. When the working fluid flows around the stator blade 113, pressure acting on the concave surface 116 is greater than that acting on the convex surface 117. For this reason, the concave surface 116 is generally referred as a high-pressure surface or a positive pressure side, and the convex surface 117 is generally referred as a low-pressure surface or a negative pressure side. Both the concave and convex surfaces 116 and 117 are streamlined surfaces. The stator 6 rotates due to the pressure difference between the sides of the stator blade.

The stator 6 is disposed between the impeller 4 and the turbine 5 such that the convex surface 117 substantially faces the turbine 5, and the concave surface 116 substantially faces the impeller 4. When the torque converter rotates in the forward direction, a high pressure is produced at the concave surface 116, and a low pressure is produced at the convex surface 117.

As shown in FIG. 4, the cross-sectional area of the stator blade 113 gradually increases as it approaches the shell 111. That is, the cross-sectional area near the core 112 is less than the cross-sectional area near the mid span, and the cross-sectional area of near the mid span is less than the cross-sectional area near the shell 111.

As shown in FIG. 3, a gap between the trailing edge 115 and the impeller 4 is maintained to be substantially constant from the shell 111 to the core 112. That is, the leading edge 114 is formed in a direction parallel to a radial direction, and a length from the leading edge 114 to the trailing edge 115 increases as it approaches the shell 111. The trailing edge 115 is angled from the shell 111 toward the impeller 4 so that the concave surface 116 and the convex surface 117 respectively have substantially trapezoidal shapes.

A predetermined gap between the neighboring stator blades is maintained. In a preferred embodiment, the gap is in a range of 1.5 mm to 2.5 mm. Consequently, a window portion where the stator blades overlap each other is avoided, and the axial size of the stator significantly decreases, thereby making it possible to manufacture the stator through a casting method.

As shown in FIG. 4, when the torque converter 1 rotates, a high pressure region is formed near the leading edge 114, and the high pressure acts on the stator blade 113 in a rotational direction of the stator blade 113. Also, a low pressure region is formed near the trailing edge 115, and the high pressure acts on the stator blade 113 in a rotational direction of the stator blade 113.

Flow characteristics in the torque converter with the stator according to the present invention will be explained by an exemplary computational flow analysis using the STAR-CD® program (CD adapco Group) and the experiment results obtained therefrom.

Inlet and outlet angles of the impeller, the turbine, and the stator of the torque converter are set as follows:

|  | Impeller | turbine | stator |
|---|---|---|---|
| Inlet angle ( )° | 36.92 | −51.89 | 4.35 |
| Outlet angle ( )° | −4.28 | 61.03 | −59.81 |

The surface area of the stator is 1425 mm², and the solidity σ is 0.7. The solidity is defined as l/s, where l is the length of the chord of the stator blade at the outermost portion thereor and s is the distance between the trailing edges of adjacent stator blade stator blades at the outermost portion thereof.

Through 3-dimensional flow analysis, the torques on each of the three components of the torque converter can be calculated by summing the partial torques, which are products of the pressure forces on each sector of the blades and the radius from the central axis. Consequently, the torque of each blade can be calculated.

The efficiency of the torque converter using the stator blade may be observed from a static pressure coefficient Cp. The static pressure coefficient is a non-dimensional value. A pressure distribution around the stator blade can be determined from the static pressure coefficient. The efficiency of the transfer of the torque can also be determined from the pressure distribution. The static pressure coefficient Cp can be obtained from the following equation 1.

$$C_P = \left(\frac{1}{2}\right)\left(\frac{P - P_{REF}}{\rho(\gamma\omega)^2}\right)$$ [Equation 1]

where P is the static pressure, $P_{REF}$ is the reference static pressure at inlet, ρ is a density of the working fluid (about 813 kg/m³), γ is a radius of the stator, and ω is a rotation speed of the impeller (about 2500 rpm).

Figure 5:
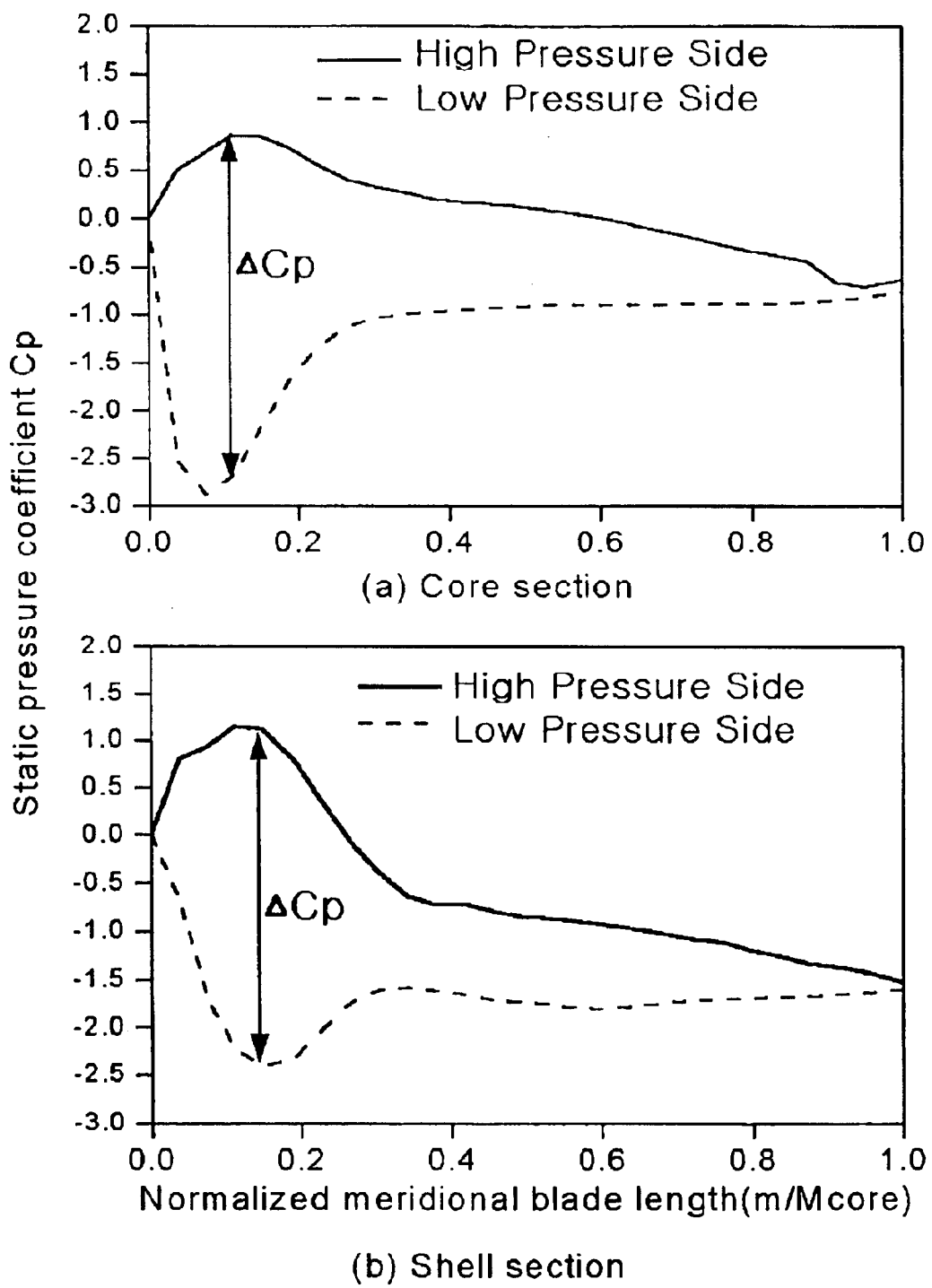
FIG. 5 shows a static pressure coefficient diagram of the stator blade of the torque converter according to the present invention.

Using the equation 1, the static pressure coefficient $C_p$ can be obtained. FIG. 5 shows the result. Here, the density of the working fluid ρ is 843 kg/m³, and the rotational speed of the impeller ω is 2500 rpm.

FIG. 5 shows graphs illustrating the variations of the static pressure coefficient $C_p$ on both sides of the stator blade when the speed ratio (e) of a rotational speed of the impeller to a rotation speed of the turbine is 0.

The difference of the static pressure coefficient is proportional to the difference of the pressure. Therefore, as the difference of the static pressure coefficient increases, the generated torque becomes greater so that the torque transferring efficiency is improved.

The speed ratio e of the torque converter is defined as No/Ni, where No is a turbine rpm and Ni is an impeller rpm. While idling, the speed ratio is 0 because the turbine does not rotate.

A difference of the static pressure coefficient $C_p$ between the high-pressure surface 116 and the low-pressure surface 117 is 3 to 4 near the core 112, and near the shell 111, a difference of the static pressure coefficients between the high-pressure surface 116 and the low-pressure surface 117 is 3 to 3.5.

That is, in the stator according to the present invention, there is a difference of the static pressure coefficients between the high-pressure region and the low-pressure region. Consequently, this indicates that the torque transferring efficiency is good in comparison with prior art stators, which typically only have a difference of 2 to 2.5. If the difference of the static pressure coefficient becomes larger, the torque difference becomes larger.

Further, if the torque difference becomes greater, a torque ratio also increases. The torque ratio is defined as turbine torque/impeller torque, and a torque efficiency is defined as (the torque ratio/the speed ratio)*100. Therefore, output efficiency of the torque converter according to the present invention is improved relative to prior art torque converters.

The number of blades of the stator according to the present invention can be reduced. Also the thickness of the stator can be reduced by eliminating the window. Consequently, the thickness of the stator has been decreased, making it possible to manufacture the stator through a casting method.

By extending the trailing edge toward the impeller, the gap between the leading edge and the impeller is maintained constant, so that the surface of the flow is increased and the torque lost by collision of the working fluid against the impeller is decreased. Therefore, it is possible to reduce the thickness of the stator and increase the efficiency of the torque converter.

Although preferred embodiments of the present invention have been described in detail hereinabove, it should be clearly understood that many variations and/or modifications of the basic inventive concepts herein taught which may appear to those skilled in the present art will still fall within the sprit and scope of the present invention, as defined in the appended claims.

What is claimed is:

1. A stator adapted to be disposed between an impeller and a turbine of a torque converter, the stator comprising:

an annular shell;

an annular core disposed radially outside the shell; and a plurality of stator blades connecting the shell and the core, each blade comprising a leading edge adjacent the turbine, a trailing edge adjacent the impeller, a streamlined concave surface extending from the leading edge to the trailing edge and substantially facing the turbine, and a streamlined convex surface extending from the leading edge to the trailing edge and substantially facing the impeller, wherein a cross-sectional area of the stator blade increases as it approaches the shell, and a predetermined gap in a range of from about 1.5 mm to about 2.5 mm is formed between the neighboring stator blades such that the neighboring stator blades do not overlap with one another.

2. The stator of claim 1, wherein the trailing edge of each stator blade is angled such that a gap between the trailing edge and the impeller is maintained constant.

3. The stator of claim 1, wherein a difference of static pressure coefficients between the concave surface and the convex surface is between 3 to 3.5.

4. A torque converter for use with an automatic transmission comprising:

an impeller;

a turbine opposing said impeller;

a stator disposed between said impeller and said turbine, said stator comprising:

an annular shell;

an annular core disposed radially outside the shell; and a plurality of stator blades connecting the shell and the core, each blade comprising a leading edge adjacent the turbine, a trailing edge adjacent the impeller, a streamlined concave surface extending from the leading edge to the trailing edge and substantially facing the turbine, and a streamlined convex surface extending from the leading edge to the trailing edge and substantially facing the impeller, wherein a cross-sectional area of the stator blade increases as it approaches the shell, and a predetermined gap in a range of from about 1.5 mm to about 2.5 mm is formed between the neighboring stator blades such that the neighboring stator blades do not overlap with one another.

5. The torque converter of claim 4, wherein the trailing edge of each stator blade is angled such that a gap between the trailing edge and the impeller is maintained constant.

6. The torque converter of claim 4, wherein a difference of static pressure coefficients between the concave surface and the convex surface is between 3 to 3.5.

* * * * *